United States Patent
Vintilescu et al.

(10) Patent No.: US 7,434,383 B2
(45) Date of Patent: Oct. 14, 2008

(54) BYPASS DUCT BOSS REPAIR TECHNOLOGY

(75) Inventors: Ion V. Vintilescu, Phoenix, AZ (US); Vincent Chung, Tempe, AZ (US); Kevin A. Spoth, Chandler, AZ (US); George W. Dalley, Higley, AZ (US)

(73) Assignee: Honeywell International Inc., Morristown, NJ (US)

( * ) Notice: Subject to any disclaimer, the term of this patent is extended or adjusted under 35 U.S.C. 154(b) by 681 days.

(21) Appl. No.: 11/128,658

(22) Filed: May 12, 2005

(65) Prior Publication Data
US 2006/0254661 A1 Nov. 16, 2006

(51) Int. Cl.
*F02K 3/02* (2006.01)
(52) U.S. Cl. .......................... 60/226.1; 60/796
(58) Field of Classification Search ............... 60/226.1, 60/797, 796, 39.08, 802; 156/98, 293, 91, 156/92
See application file for complete search history.

(56) References Cited

U.S. PATENT DOCUMENTS

| | | | |
|---|---|---|---|
| 4,013,495 A | 3/1977 | Golumbic | |
| 4,411,134 A | 10/1983 | Moir | |
| 4,659,525 A | 4/1987 | Speer | |
| 4,924,581 A | 5/1990 | Jakobsen | |
| 5,275,529 A * | 1/1994 | Langenbrunner et al. | ... 415/119 |
| 5,601,676 A | 2/1997 | Zimmerman et al. | |
| 5,653,836 A | 8/1997 | Mnich et al. | |
| 5,925,204 A | 7/1999 | Hoffmann, Sr. | |
| 6,077,465 A | 6/2000 | Fenske | |
| 6,149,749 A * | 11/2000 | McBroom | ..................... 156/94 |
| 6,416,278 B1 | 7/2002 | Caddell, Jr. et al. | |
| 6,656,299 B1 * | 12/2003 | Grosskrueger et al. | ........ 156/98 |
| 6,680,099 B1 | 1/2004 | Brewer | |
| 6,761,783 B2 | 7/2004 | Keller et al. | |
| 6,942,452 B2 * | 9/2005 | Bruno et al. | ................ 415/135 |
| 7,238,247 B2 * | 7/2007 | Bouillon et al. | ............... 156/92 |

* cited by examiner

*Primary Examiner*—Ted Kim
(74) *Attorney, Agent, or Firm*—Ingrassia, Fisher & Lorenz, P.C.

(57) ABSTRACT

The present invention provides a bypass duct and boss assembly comprising: a bypass duct having an exterior surface, an interior surface, an edge surface, an inner bonding surface, and a side wall surface, wherein the edge surface further defines an aperture; a boss having a lip surface, a side surface, and a face surface, wherein the boss is disposed within the aperture of the bypass duct such that the lip surface of the boss forms matched bonding surfaces with a portion of the exterior surface of the bypass duct, and such that the side surface of the boss forms matched bonding surfaces with the edge surface of the bypass duct; a patch having a patch edge, a patch inner surface, and a patch outer surface, wherein the patch is disposed such that the patch inner surface forms matched bonding surfaces with the inner bonding surface of the bypass duct and the face surface of the boss, and such that the patch edge forms matched bonding surfaces with the side wall surface of the bypass duct, the patch further having a thickness and curvature, and the patch further disposed such that the patch outer surface forms a continuous curvature with the interior surface of the bypass duct; and adhesive disposed between the matched bonding surfaces so as to firmly bond the bypass duct, boss, and patch into the assembly.

20 Claims, 6 Drawing Sheets

US 7,434,383 B2

BYPASS DUCT BOSS REPAIR TECHNOLOGY

FIELD OF THE INVENTION

The present invention relates to the repair of a damaged bypass duct and boss assembly, and more particularly, relates to the use of a patch to increase the bonding strength of a repaired bypass duct and boss assembly for use with gas turbine engines.

BACKGROUND OF THE INVENTION

Gas turbine engines such as turbofan engines used in jet aircraft often include an assembly of a bypass duct and boss. The bypass duct provides a shell-like structure that surrounds core engine components such as the compressor stage, combustion stage, and/or turbine stage of the engine. Fan air from the turbine engine passes through the interior of the bypass duct. Engine control equipment is typically positioned on the exterior of the bypass duct. This control equipment, such as for example air bleed ducts, oil tubing, electronic control wiring, and hydraulic pressure lines, is in some designs mounted on the boss, which is in turn mounted on the bypass duct.

During operation of the gas turbine engine, the boss/bypass duct assembly may experience various stresses. For example, the components may experience stress from the thermal cycle associated with engine heat up and cool down. Moreover, the assembly can experience significant vibration effects both from the engine and from fluid forces as bleed air passes through the ductwork that is mounted on the boss. Engine accelerations and decelerations may further stress the boss and bypass duct joint. Additionally, interior portions of the bypass duct and boss assembly experience turbulent air flows and air pressures that accompany fan air. The joint between the bypass duct and its associated boss may therefore be subject to stress failure. It would be desired to develop a robust assembly method that minimizes the potential for such failure.

After a certain degree of service, a bypass duct and boss assembly may need repair or replacement because of the above-described stresses that the assembly encounters. The option of replacing the bypass duct with a new part is unattractive due to the potentially high expense involved. Moreover, when a bypass duct becomes damaged, it may be that only the duct/boss interface needs to be repaired, while the structures themselves are still usable.

Further, it may be economically disadvantageous to periodically inspect a bypass duct/boss assembly for signs of cracking and diminished performance. Inspection is time consuming, and in those cases involving high capital equipment, it can be costly and undesirable to take a vehicle out of service for inspection. Thus, a bypass duct and boss assembly may be scheduled for inspection on a time-usage basis rather than on a wear basis. With such a repair management strategy there is a need for a bypass duct and boss assembly that has a demonstrably longer useful life so that the time between scheduled inspections may be extended.

Hence there is an ongoing need to provide improved methods for repairing damaged bypass duct/boss assemblies. It is desirable to develop repair methods that are simple, inexpensive, and restore the bypass duct and boss assembly to a level of performance at least equal to, or preferably, superior to that of the original construction. With respect to those assemblies in the aviation industry, it is further desired to develop repair methods that improve the life-cycle of the repaired assembly so as to increase the service life of the unit. Finally, it is desired that the repair method allow the assembly to be quickly returned to service. The present invention addresses one or more of these needs.

SUMMARY OF THE INVENTION

The present invention provides an apparatus and methods for providing a bypass duct and boss assembly. In one embodiment, and by way of example only, there is provided an assembly comprising: a bypass duct having an exterior surface, an interior surface, an edge surface, an inner bonding surface, and a side wall surface, wherein the edge surface further defines an aperture; a boss having a lip surface, a side surface, and a face surface, wherein the boss is disposed within the aperture of the bypass duct such that the lip surface of the boss forms matched bonding surfaces with a portion of the exterior surface of the bypass duct, and such that the side surface of the boss forms matched bonding surfaces with the edge surface of the bypass duct; a patch having a patch edge, a patch inner surface, and a patch outer surface, wherein the patch is disposed such that the patch inner surface forms matched bonding surfaces with the inner bonding surface of the bypass duct and the face surface of the boss, and such that the patch edge forms matched bonding surfaces with the side wall surface of the bypass duct, the patch further having a thickness and curvature, and the patch further disposed such that the patch outer surface forms a continuous curvature with the interior surface of the bypass duct; and adhesive disposed between the matched bonding surfaces so as to firmly bond the bypass duct, boss, and patch into the assembly.

In a further embodiment, still by way of example only, there is provided a method for forming a bypass duct, a boss, and a patch into an assembly, the method includes the steps of: undercutting an interior surface of a bypass duct so as to form a matched bonding surface; preparing matched bonding surfaces on the bypass duct, boss, and patch for bonding; applying adhesive to at least one surface of the matched bonding surfaces on the bypass duct, boss, and patch; positioning the boss in the bypass duct in a fully fitted position so as to bring matched bonding surfaces on the boss and the bypass duct into proximity; positioning the patch in a fully fitted position so as to bring matched bonding surfaces on the patch into proximity with matched bonding surfaces on the boss and the bypass duct; and further positioning the patch such that an upper surface of the patch forms a continuous curvature with an interior surface of the bypass duct; and curing the adhesive so as to form the bypass duct, boss, and patch into the assembly. In the above method, the step of undercutting may further include undercutting an interior surface of a bypass duct so as to form an inner bonding surface and a side wall surface, and the bypass duct may further include an exterior surface and an interior surface. Also in the above method the boss may further include a lip surface, a side surface, and a face surface. Also in the above method the patch may further include a patch inner surface, a patch outer surface, and a patch edge. In the above method the step of positioning the boss may thus further include positioning the boss such that the lip surface of the boss forms a matched bonding surface with a portion of the exterior surface of the bypass duct, and such that the side surface of the boss forms a matched bonding surface with edge surface of the bypass duct; and the step of positioning the patch may further include positioning the patch such that the patch inner surface forms a matched bonding surface with the face surface of the boss and the inner bonding surface of the bypass duct, and such that the patch edge forms a matched bonding surface with the side wall surface of the bypass duct.

Other independent features and advantages of the bypass duct and boss repair technology will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
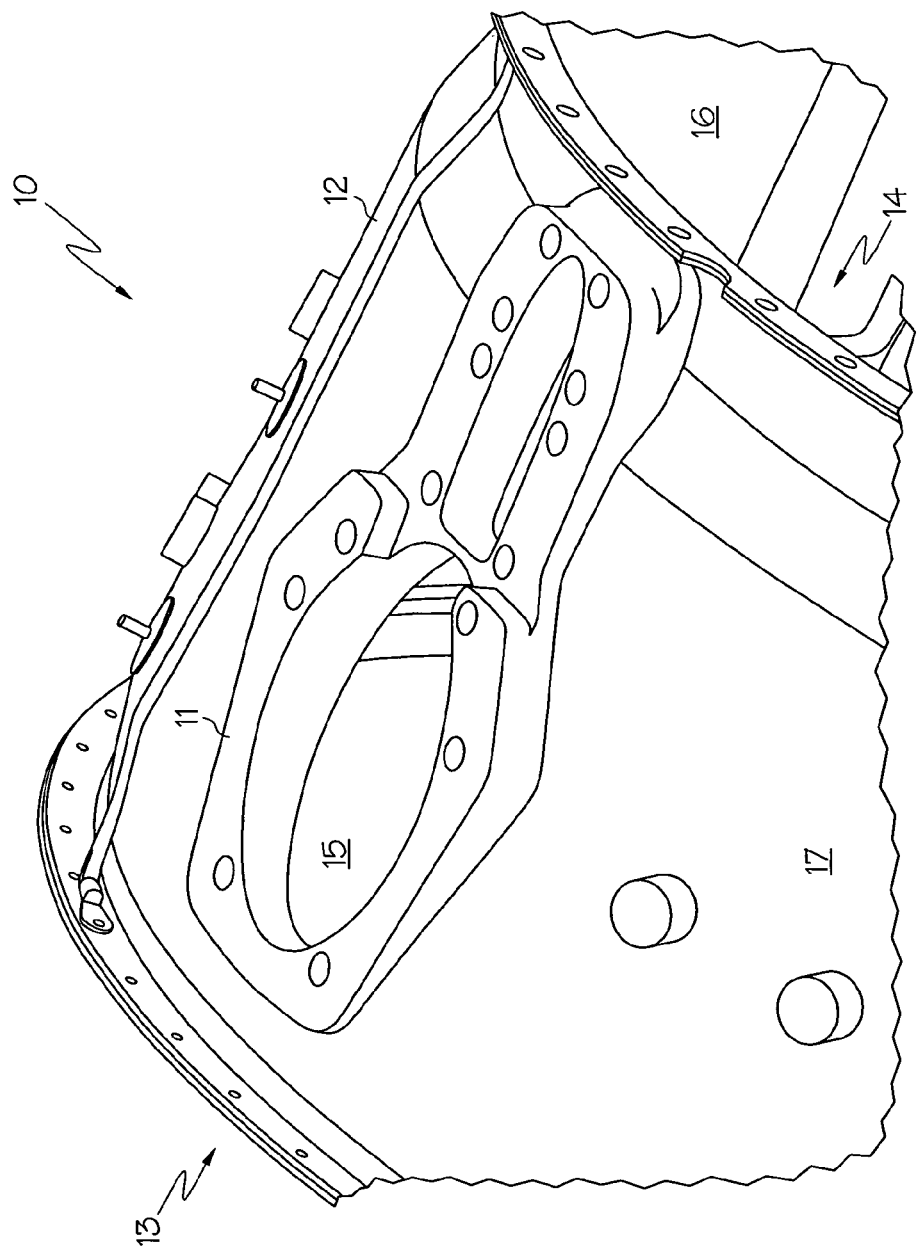
FIG. 1 is a perspective view of a boss and bypass duct assembly, according to an embodiment of the present invention.

Referring now to FIG. 1 there is shown a perspective view of assembly 10 that includes boss 11 and bypass duct 12. Bypass duct 12 is typically hollow in shape and includes an interior surface 16 and exterior surface 17 that define an interior region and exterior region, respectively. As is known in the art, the gross shape of bypass duct 12 is approximately cylindrical, but will typically have some curvature such that it generally tapers from a larger diameter at a first opening 13 to a smaller diameter at an opposite opening 14. It will be appreciated, however, that various designs of bypass duct 12 may have different shapes. Boss 11 is positioned within an aperture 15 formed in bypass duct 12. Boss 11 itself typically has openings and thus provides fluid communication between the interior region and exterior region of bypass duct 12. FIG. 1 shows the assembly 10 from a perspective in the exterior region of the bypass duct 12. Not shown in FIG. 1 is patch 41, which, as explained further below, assists in the bonding of boss 11 and bypass duct 12. When assembled in a gas turbine engine, fan air typically flows in the interior region of bypass duct 12. Additional structures (not shown) are also typically mounted to boss 11, such as for example, bleed air ductwork, electronic wiring, lubrication tubing, and hydraulic control tubing.

Figure 2:
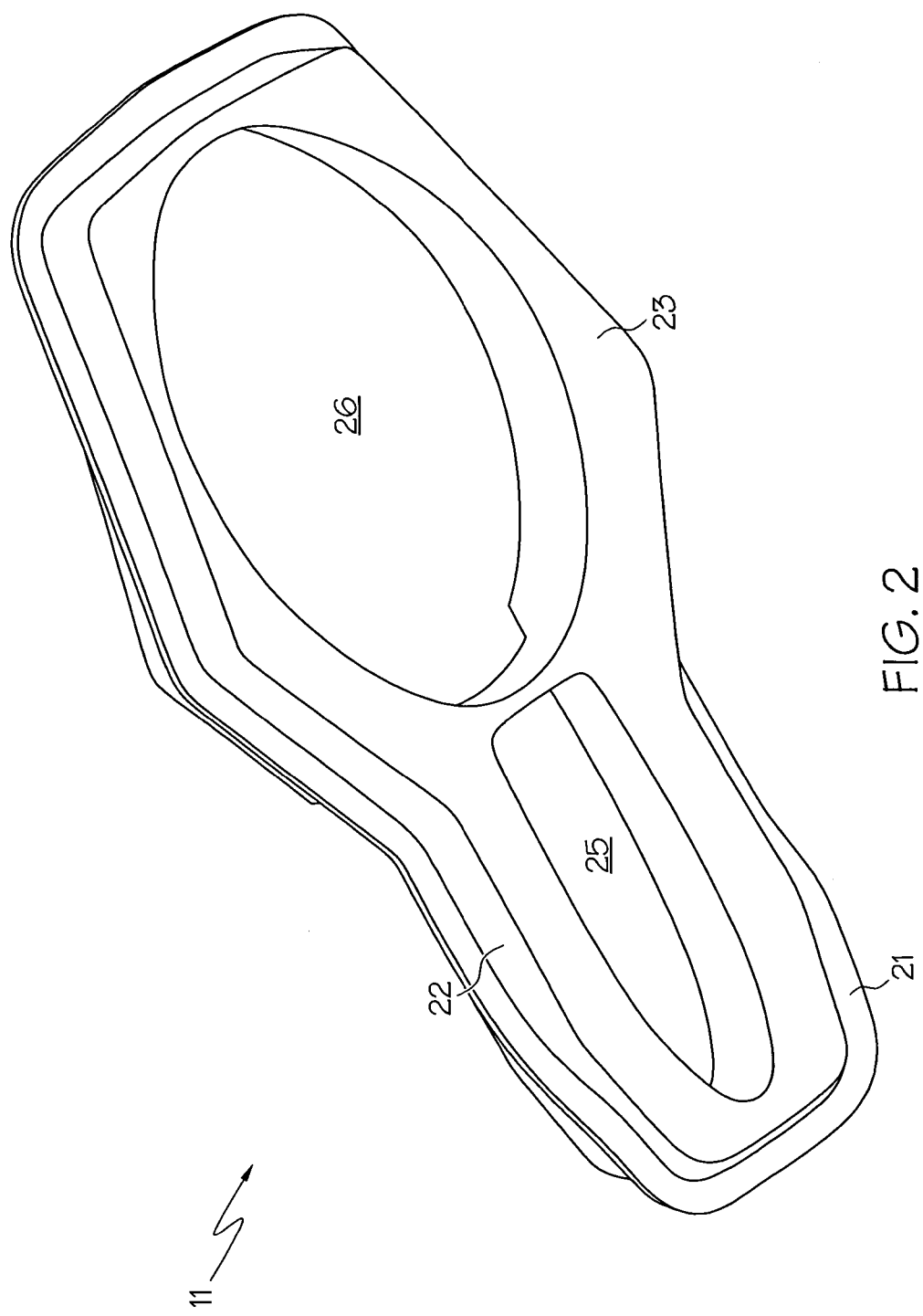
FIG. 2 is a perspective view of an exemplary boss, according to an embodiment of the present invention.

Referring now to FIG. 2 there is shown a perspective view of an exemplary embodiment of boss 11. Boss 11 may take a number of shapes as boss 11 is itself configured so as to accommodate both the shape of aperture 15 in bypass duct 12 as well as to accept additional structures that will be mounted onto boss 11. For example, boss 11 is shown as having two windows 25, 26; however a different number of windows is possible. Thus, the representation of boss 11 in FIG. 2 is exemplary only, and it will be understood that the shape will depend on a specific engine requirement. In a preferred embodiment, however, boss 11 includes three surfaces: lip surface 21, side surface 22, and face surface 23. As further described herein, each of the surfaces 21, 22, and 23 is shaped so as to accommodate the fitting and bonding of boss 11 to matched bonding surfaces on bypass duct 12 or patch 41.

Figure 3:
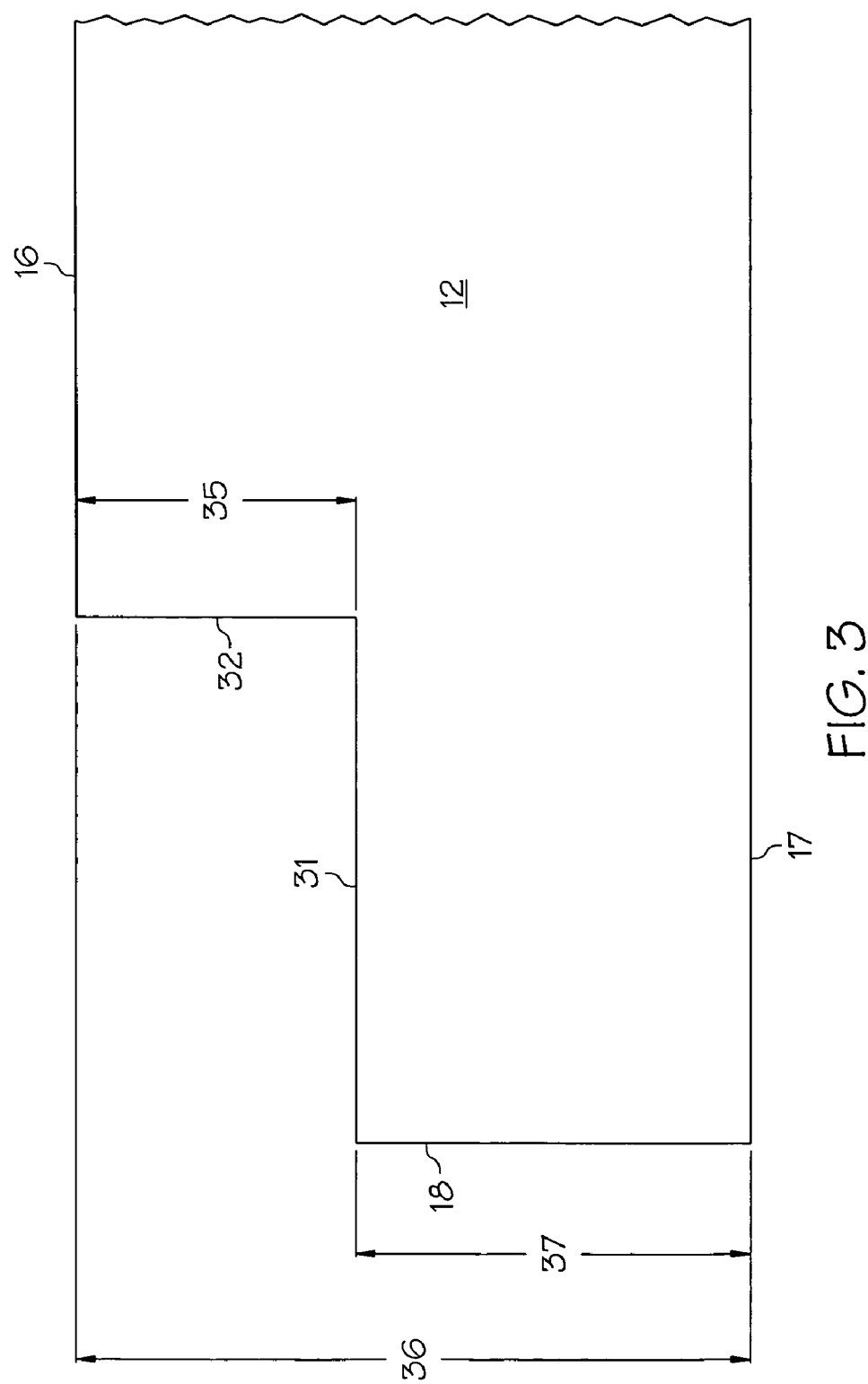
FIG. 3 is a close up, cross-sectional view of a bypass duct in the area of an aperture, according to an embodiment of the present invention.
Figure 5:
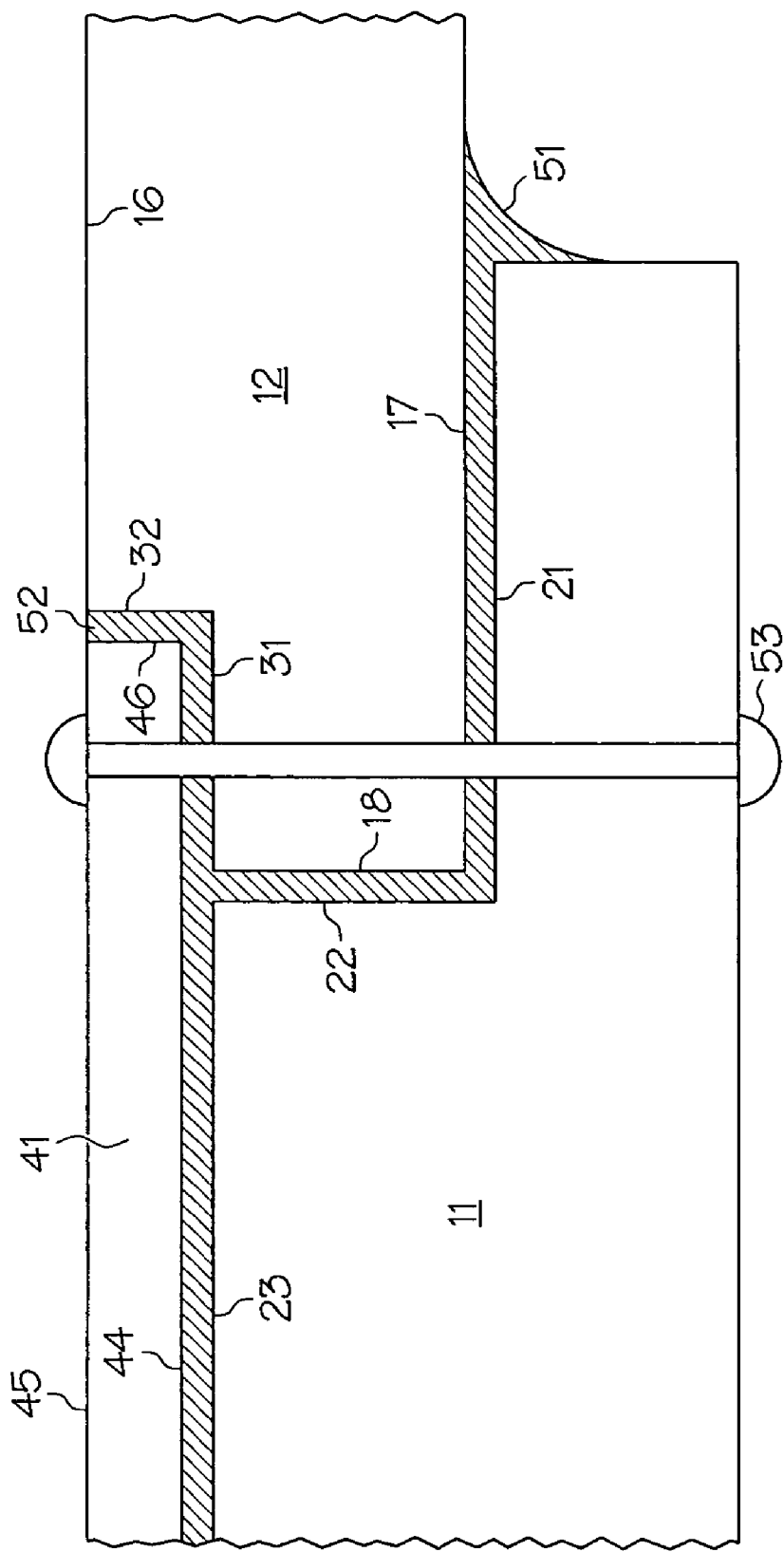
FIG. 5 is close up, cross-sectional view showing a boss/bypass duct assembly according to an embodiment of the present invention.

Boss 11 and bypass duct 12 are reciprocally shaped so as to assemble in combination. Aperture 15 of bypass duct 12 defines edge surface 18 on bypass duct 12 such that edge surface 18 defines an aperture contour. FIG. 3, showing a close up cross-sectional view of bypass duct 12 in the area of aperture 15, partially illustrates edge surface 18. The side surface 22 of boss 11 is shaped so as to closely fit within the aperture contour defined by edge surface 18 when boss 11 is positioned within aperture 15, as partially shown in FIG. 5. Further, fitting boss 11 into aperture 15 brings lip surface 21 of boss 11 into proximity with a portion of exterior surface 17 of bypass duct 12, thereby creating matched bonding surfaces. Lip surface 21 provides a limit of movement whereby boss 11 cannot pass farther into aperture 15. Boss 11 may be positioned in aperture 15 in a fully fitted position, wherein lip surface 21 has approached exterior surface 17 as closely as possible with a normal allowance for adhesive therebetween. The fully fitted position additionally means that degree of proximity between surfaces as to be allow for good adhesive bonding between the surfaces. The allowance given for adhesive disposed between the surfaces in the fully fitted position, as shown in FIG. 5, is such that the surfaces may not be in actual contact. Also, when boss 11 is in the fully fitted position within aperture 15, side surface 22 and edge surface 18 are in proximity so as to form matched bonding surfaces. As later described more fully, the boss 11 and bypass duct 12 may be bonded to each other, in part, by providing adhesive between the matched bonding surfaces.

Referring again to FIG. 3, the figure illustrates that it is preferred to machine away a portion of the inner surface 16 of bypass duct 12 in the area that surrounds aperture 15. This machining creates an inner bonding surface 31 and side wall surface 32. A machined thickness 35 is removed from the original thickness 36 of bypass duct 12. The machining to create inner bonding surface 31 thus creates a portion of bypass duct 12 with reduced thickness 37. The reduced thickness 37 of bypass duct 12 at inner bonding surface 31 is such that, when boss 11 is in the fully fitted position, face surface 23 of boss 11 aligns with inner bonding surface 31. Explained another way, when boss 11 is in the fully fitted position, face surface 23 of boss 11 is substantially level with inner bonding surface 31. It will here be appreciated that the overall shape of inner bonding surface 31 is curved and not flat, as is the overall shape of interior surface 16 of bypass duct 12. Face surface 23 of boss 11 is characterized by a similar curvature. In that way, when boss 11 is in the fully fitted position, face surface 23 and inner bonding surface 31 will present a generally continuous curvature herein identified as patch surface.

Figure 4:
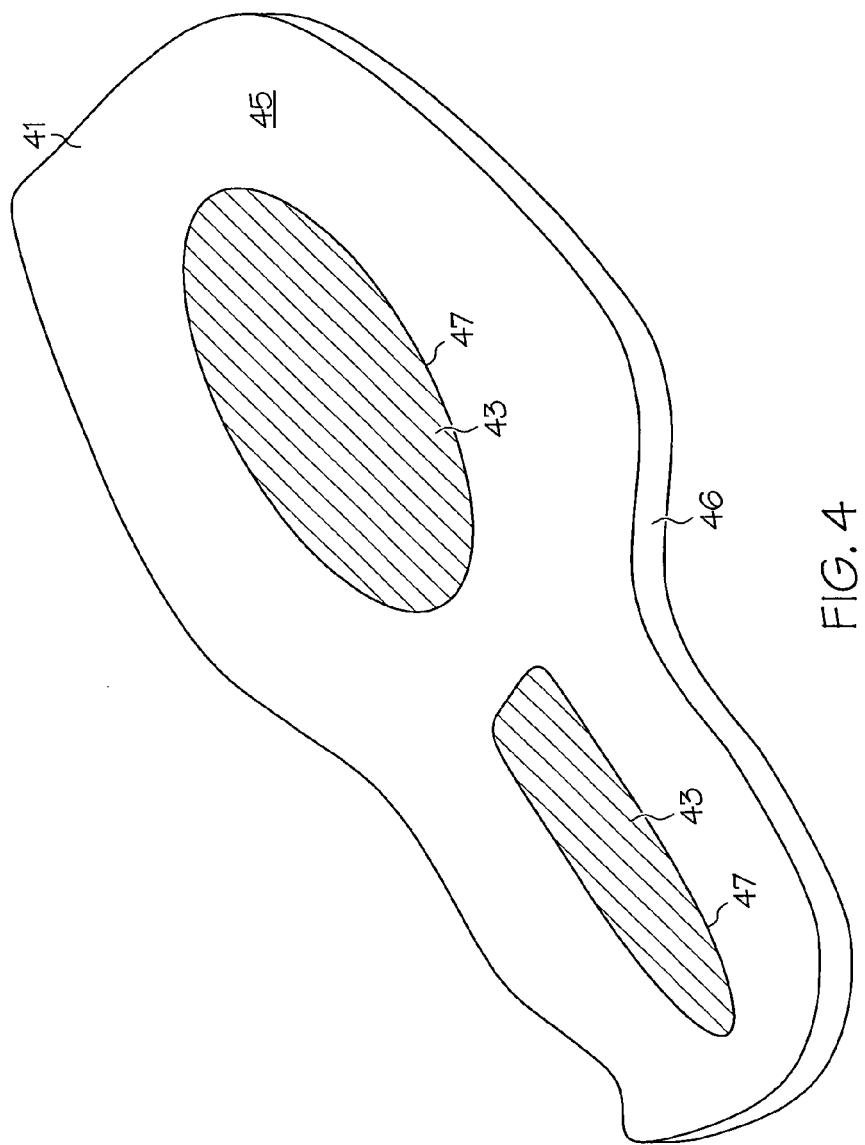
FIG. 4 is a perspective view of a patch for use in the bypass duct repair method, according to an embodiment of the present invention.

Referring now to FIG. 4 there is shown a perspective view of patch 41 according to a preferred embodiment. Patch 41 defines a patch edge 46. Patch 41 further includes patch outer surface 45 and patch inner surface 44 (shown in FIG. 5). Patch outer surface 45 is that surface that is exposed to the interior region 16 of bypass duct 12 when patch 41 is assembled with bypass duct 12 and boss 11. Patch 41 may also include one or more openings 42 which themselves define an inner patch contour 47. Inner patch contour 47 generally corresponds to the contour of windows 25, 26 in boss 11. As with boss 11, patch 41 may take a number of different shapes because patch 41 is configured so as to accommodate a side wall surface 32 and a machined thickness 35, and those dimensions may change in different designs.

Patch 41 may also be placed in a fully fitted position when assembled with bypass duct 12 and boss 11 as partially shown in FIG. 5. The fully fitted position again means that certain matched bonding surfaces are brought together as close as possible yet with a normal allowance for adhesive, and with that degree of proximity between matched bonding surfaces as to provide for good adhesive bonding therebetween. Patch edge 46 and side wall surface 32 form one set of matched bonding surfaces; patch edge 46 is shaped so as to substantially conform to the contour defined by side wall surface 32. Patch inner surface 44 also forms matched bonding surfaces with both inner bonding surface 31 and face surface 23 of boss 11. It will further be noted that the thickness of patch 41, when combined with adhesive, generally corresponds to the machined thickness 35 used in creating inner bonding surface 31, as shown in FIG. 5. Thus, patch 41 is further shaped so that in the fully fitted position, patch inner surface 44 closely matches patch surface (inner bonding surface 31 and face surface 23). When patch 41 is in the fully fitted position, patch outer surface 45 also substantially continues the curvature of inner surface 16 of bypass duct 12.

The embodiment described above can be used when bypass duct 12 is formed of either metal or composite materials. In aircraft applications, bypass duct 12 is frequently formed of a high strength composite material such as, by non-limiting example, BMI (bismaleimide) resin with fibers such as graphite or fiber glass. As is known in the art, bypass duct 12 may also include an internal honeycombed structure, which is not shown in the figures. When bypass duct 12 comprises a composite, it is preferred that patch 41 be formed of a compatible material. Thus, for example patch 41 may be a composite of resin and fibers, such as for example, BMI resin and graphite or fiberglass fibers. Patch 41 may comprise more than one layer or ply of material. Alternatively, if bypass duct 12 comprises a metal, patch 41 may also comprise a metal, such as for example an aluminum or aluminum alloy used in aviation applications. Typically patch 41 will have a rigidity similar to that of bypass duct 12.

Having described the boss and bypass duct 12 and boss 11 assembly 10 from a structural standpoint, a method of forming the assembly will now be described.

Figure 6:
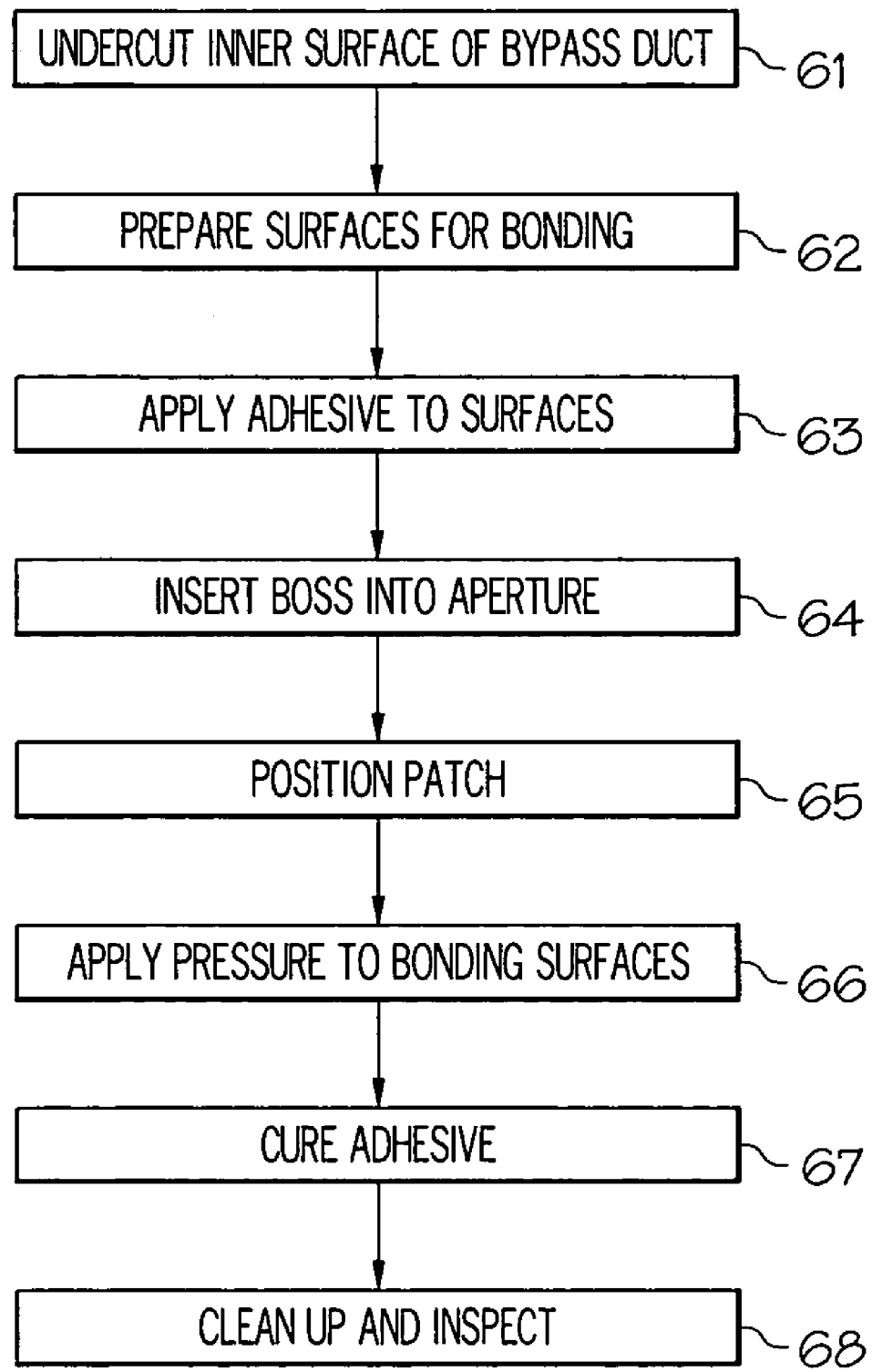
FIG. 6 is a flow chart showing steps in an exemplary repair method, according to an embodiment of the present invention.

Referring now to FIG. 6 there are shown exemplary steps in one embodiment of the bypass duct boss repair technology. A repair procedure (or retrofit procedure) begins by removing a boss 11 from the bypass duct 12. Similarly, any remaining cured adhesive is removed. If this procedure is adapted to new construction, then the removal step is not needed. Using good work guidelines, the removal of the damaged boss and adhesive material does not damage the underlying duct laminate. If the bypass duct 12 is damaged in the area of the aperture 15, the damage to bypass duct 12 is first repaired.

In step 61 of the method, the bypass duct 12 is undercut to a desired amount. As explained with respect to the apparatus, one method of doing this is to machine the interior surface 16 of bypass duct 12. The undercut is done so as to define edge surface 31 and side wall 32, and thus to accommodate boss 11 and patch 41 with an adhesive allowance.

In step 62 matched bonding surfaces are prepared. This includes good practices such as brushing, air blowing, solvent cleaning, and drying. If needed for a particular adhesive, other steps may be taken to otherwise prepare the surface for the adhesive. Aluminum surfaces may, if needed, receive a chemical or mechanical roughening. Matched bonding surfaces include surfaces on boss 11, bypass duct 12, and patch 41 that contact adhesive. The matched bonding surfaces include lip surface 21 and the matching area on exterior surface 17, side surface 22 and the matching area on edge surface 18, patch surface (comprising face surface 23 and inner bonding surface 31) and the matching area of inner patch inner surface 44 on patch 41, also edge wall surface 32 and the matching area on patch edge 46.

In step 63 adhesive is applied to the matched bonding surfaces. In a preferred embodiment, adhesive is applied to both surfaces in a pair of reciprocal mating surfaces. Of course, specific recommendations for an adhesive are to be followed, and in an alternative embodiment, adhesive may be applied to only one surface of a matched pair of bonding surfaces. Standard means in the industry may be used to apply adhesive including for example, rollers, brushes, and spatulas.

In step 64 the boss 11 is inserted into the aperture 15 of bypass duct 12. The boss 11 is inserted so as to achieve the fully fitted position. With an allowance for adhesive, matched bonding surfaces are now in a degree of proximity for good adhesive bonding.

In step 65 patch 41 is placed in its fully fitted position. The bypass duct 12 may be designed for specific airflow characteristics in the interior region. Depending on the design, protrusions, roughness, or other obstructions that affect air flow in the interior region may need to be avoided. Thus, it is typically preferred that patch 41, when bonded, lay in a manner that matches the interior curvature and contour of bypass duct 12.

In optional step 66, pressure is applied so as to assist in bringing boss 11 and patch 41 into close contact with respect to bypass duct 12. Step 66 is identified as an optional step because, depending on the adhesive used, pressure may not be required. However, in a preferred embodiment pressure is applied for several reasons. Generally, two part epoxies benefit from the application of pressure. Further, the application of pressure is advantageous for the assembly 10 in that the application of pressure tends to squeeze out some excess adhesive. Using good practices, this excess is removed. However, the squeezing out of this excess adhesive helps in forming a good bond while minimizing the presence of voids or air pockets in the adhesive joint. It is preferred that the joint be air tight. Thus, in one embodiment, adhesive may be overapplied with some excess expected to be removed. Pressure is further advantageous in the current method in that pressure helps to maintain boss 11 and patch 41 in the fully fitted position and to bring matched bonding surfaces into a desired proximity. Pressure may be applied using a variety of means, such as but not limited to, c-clamps and forms. In a preferred embodiment, forms are used wherein a form has a surface which matches one of the component surfaces. In a preferred embodiment, pressure is applied up to approximately 10 psi.

In step 67, the adhesive is cured. This typically involves allowing some period of time to pass, during which the chemical process to cure the adhesive takes place. The curing may take place at room temperature or, if desired, in a heated environment.

In step 68, the assembly is cleaned up and inspected. Other optional steps may also be included in the above assembly method. In one embodiment, an adhesive bead is applied to the boss/bypass duct exterior joint. This bead is then formed into a fillet 51, shown in FIG. 5. The fillet 51 advantageously bonds the boss 11 and bypass duct 12 while further sealing the lap joint therebetween.

Referring again to FIG. 5, certain aspects of the above repair/assembly method are illustrated. FIG. 5 shows a cross-sectional view of the boss/bypass duct assembly. Adhesive line 52 runs along each bonding surface. While FIG. 5 may not be drawn strictly to scale, the thickness of adhesive line 52 is preferably generally uniform. However, adhesive line 52 need not be uniform in thickness. FIG. 5 further illustrates fillet 51 where boss 11 joins to bypass duct 12 on the exterior surface 17 of bypass duct 12. FIG. 5 further illustrates the preferred embodiment in which patch 41 is bonded in the fully fitted position such that patch outer surface 45 forms a surface that is generally continuous with the original interior surface 16 of bypass duct 12. Other features of the assembly previously described are also noted in FIG. 5.

In a further embodiment, boss 11 and bypass duct 12 may be further connected with any number of bonding inserts 53 as shown in FIG. 5. A bonding insert 53 comprises a fastener, such as by way of non-limiting example, an aircraft bolt or rivet. Holes (not shown) are drilled in boss 11, bypass duct 12, and patch 41. The holes are positioned so as to align when the pieces are assembled. A bonding insert 53 is then inserted in the hole and fastened. Preferably, bonding inserts 53 are used in conjunction with other fastening means such as the use of adhesive as described above. As is known in the art, adhesive may additionally be used around the holes for bonding inserts 53, and around the areas where bonding inserts 53 make contact with patch 41 and boss 11 so as to achieve an airtight seal. FIG. 5 illustrates bonding insert 53 placed in a desired position so as to pass through boss 11, bypass duct 12, and patch 41. In an alternative embodiment, bonding insert 53 may be disposed so as to pass through only boss 11 and patch 41. In addition to providing an additional bonding of parts, bonding inserts 53 are advantageous in applying pressure so as to position parts and cure adhesive.

FIG. 5 illustrates one embodiment of the invention in which the transition between surfaces is defined by a relatively clear corner or angle. However, it will be appreciated that surface transitions may be rounded or "bull-nosed" if desired. Further surfaces may be set at angles relative to each other different from that shown in the figures.

The description has identified the use of an adhesive as a preferred method of bonding the components to each other. A preferred type of adhesive is an epoxy, and a two part epoxy is still more preferred. When a two part adhesive is used, a step of preparing the adhesive, such as mixing the parts, is included in the assembly method. One exemplary kind of epoxy is marketed as LOCTITE® EA9394 epoxy. Equivalent epoxies are also suitable. In general any structural adhesive suitable for use in aeronautical applications may be used. As is known in the art, various additives such as fillers and thickeners may be used in conjunction with the adhesive. In bonding the boss 11 to the bypass duct 12 it is generally preferred to obtain a uniform adhesive thickness across the mating surfaces. The use of fillers or thickeners may assist in achieving the desired uniformity.

It will further be appreciated that certain dimensions in the boss/duct assembly may be varied so as to increase the bond strength between the boss 11 and bypass duct 12. For example, the surface area defined by inner bonding surface 31, and the reciprocal area on patch 41, may be increased or decreased. These mating surfaces define an area that bonds bypass duct 12 to patch 41. Increasing the surface area generally increases the adhesive bond strength. The adhesive can itself be selected for strength properties or other desirable characteristics, such as (again by non-limiting example) temperature stability or gradual fracture. Additionally, the thickness of patch 41 can affect the strength of the bond. Increasing the thickness can increase the bond strength. If desired, an analysis, such as a finite element method (FEM) analysis, may be performed to select any of these component dimensions or specifications.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly comprising:
   a bypass duct having an exterior surface, an interior surface, an edge surface, an inner bonding surface, and a side wall surface, wherein the edge surface further defines an aperture;
   a boss having a lip surface, a side surface, and a face surface, wherein the boss is disposed within the aperture of the bypass duct such that the lip surface of the boss forms matched bonding surfaces with a portion of the exterior surface of the bypass duct, and such that the side surface of the boss forms matched bonding surfaces with the edge surface of the bypass duct;
   a patch having a patch edge, a patch inner surface, and a patch outer surface, wherein the patch is disposed such that the patch inner surface forms matched bonding surfaces with the inner bonding surface of the bypass duct and the face surface of the boss, and such that the patch edge forms matched bonding surfaces with the side wall surface of the bypass duct, the patch further having a thickness and curvature, and the patch further disposed such that the patch outer surface forms a continuous curvature with the interior surface of the bypass duct; and
   adhesive disposed between the matched bonding surfaces so as to firmly bond the bypass duct, boss, and patch together.

2. The apparatus according to claim 1 wherein the bypass duct and patch comprise a composite material.

3. The apparatus according to claim 2 wherein the bypass duct and patch comprises BMI resin and carbon fibers.

4. The apparatus according to claim 1 wherein the bypass duct and patch comprise a metal.

5. The apparatus according to claim 1 wherein the adhesive comprises a two part epoxy adhesive.

6. The apparatus according to claim 1 wherein the bypass duct, boss, and patch further define holes in alignment, and the apparatus further comprising bonding inserts disposed in the holes so as to bond the bypass duct, boss, and patch.

7. The apparatus according to claim 1 wherein the boss and the patch further define holes in alignment, and the apparatus further comprising bonding inserts disposed in the holes so as to bond the boss and the patch.

8. The assembly according to claim 1 wherein the adhesive further comprises a substantially uniform adhesive line between the matched bonding surfaces.

9. A method for forming a bypass duct, a boss, and a patch into an assembly, the method comprising the steps of:
   undercutting an interior surface of the bypass duct so as to form a matched bonding surface;

preparing matched bonding surfaces on the bypass duct, boss, and patch for bonding;

applying adhesive to at least one surface of the matched bonding surfaces on the bypass duct, boss, and patch;

positioning the boss in the bypass duct in a fully fitted position so as to bring matched bonding surfaces on the boss and the bypass duct into proximity;

positioning the patch in a fully fitted position so as to bring matched bonding surfaces on the patch into proximity with matched bonding surfaces on the boss and the bypass duct; and such that an upper surface of the patch forms a continuous curvature with an interior surface of the bypass duct; and curing the adhesive.

10. The method according to claim 9, wherein the step of undercutting further comprises undercutting an interior surface of a bypass duct so as to form an inner bonding surface and a side wall surface; and wherein the bypass duct further comprises an exterior surface and an interior surface;

wherein the boss further comprises a lip surface, a side surface, and a face surface;

wherein the patch further comprises a patch inner surface, a patch outer surface, and a patch edge;

wherein the step of positioning the boss further comprises positioning the boss such that the lip surface of the boss forms a matched bonding surface with a portion of the exterior surface of the bypass duct, and such that the side surface of the boss forms a matched bonding surface with edge surface of the bypass duct; and wherein the step of positioning the patch further comprises positioning the patch such that the patch inner surface forms a matched bonding surface with the face surface of the boss and the inner bonding surface of the bypass duct, and such that the patch edge forms a matched bonding surface with the side wall surface of the bypass duct.

11. The method according to claim 9 further comprising the steps of:

drilling holes in the bypass duct, boss, and patch such that the holes substantially align when the boss and patch are in the fully fitted position; and installing bond inserts in the holes so as to bond the bypass duct, boss, and patch.

12. The method according to claim 9 further comprising the steps of:

drilling holes in the boss and patch such that the holes align when the boss and patch are in the fully fitted position; and installing bond inserts in the holes so as to bond the boss and the patch.

13. The method according to claim 9 further comprising the step of applying pressure to the boss and the patch so as to assist curing the adhesive.

14. The method according to claim 13 wherein the step of applying pressure comprises applying a pressure of at least 10 psi.

15. The method according to claim 9 wherein the step of applying adhesive further comprises applying a two part epoxy adhesive.

16. The method according to claim 9 further comprising the step of forming an adhesive fillet so as to further bond the boss and bypass duct.

17. The method according to claim 9 wherein the step of undercutting further comprises undercutting an interior surface of a bypass duct so as to form an inner bonding surface with a surface area selected to provide a desired bonding strength at the inner bonding surface.

18. The method according to claim 9 wherein the patch has a dimension of thickness and further comprising the step of selecting the patch thickness based on FEM analysis.

19. A method for forming a bypass duct, a boss, and a patch into an assembly, the method comprising the steps of:

undercutting an interior surface of a bypass duct so as to form an inner bonding surface and a side wall surface; and wherein the bypass duct further comprises an exterior surface and an interior surface;

preparing matched bonding surfaces on the bypass duct, boss, and patch for bonding, wherein the matched bonding surfaces comprise:

the lip surface of the boss and a portion of the exterior surface, the side surface of the boss and the edge surface of the bypass duct, the patch inner surface and the face surface of the boss and the inner bonding surface of the bypass duct, and the patch edge and the side wall surface of the bypass duct;

applying adhesive to at least one surface of the matched bonding surfaces on the bypass duct, boss, and patch;

positioning the boss in the bypass duct in a fully fitted position such that the lip surface of the boss forms a matched bonding surface with a portion of the exterior surface of the bypass duct, and such that the side surface of the boss forms a matched bonding surface with edge surface of the bypass duct;

positioning a patch in a fully fitted position such that the patch inner surface forms a matched bonding surface with the face surface of the boss and the inner bonding surface of the bypass duct, and such that the patch edge forms a matched bonding surface with the side wall surface of the bypass duct; and further positioning the patch such that an upper surface of the patch forms a continuous curvature with an interior surface of the bypass duct;

applying pressure on the boss and the patch so as to bring the matched bonding surfaces into proximity; and curing the adhesive so as to form the bypass duct, boss, and patch into the assembly.

20. The method according to claim 19 wherein the step of applying pressure further comprises applying pressure with a form that substantially matches the curvature of the patch outer surface.

* * * * *